United States Patent
Allen et al.

(10) Patent No.: US 8,918,393 B2
(45) Date of Patent: Dec. 23, 2014

(54) IDENTIFYING A SET OF CANDIDATE ENTITIES FOR AN IDENTITY RECORD

(75) Inventors: Thomas B. Allen, Henderson, NV (US); Brian E. Macy, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 12/893,982

(22) Filed: Sep. 29, 2010

(65) Prior Publication Data

US 2012/0078949 A1    Mar. 29, 2012

(51) Int. Cl.
*G06F 17/30* (2006.01)

(52) U.S. Cl.
CPC ............................ *G06F 17/30539* (2013.01)
USPC ........................................................ 707/737

(58) Field of Classification Search
CPC ................................................. G06F 17/30303
USPC .............. 707/769, E17.014, 737; 715/E17.11
See application file for complete search history.

(56) References Cited

U.S. PATENT DOCUMENTS

| | | | |
|---|---|---|---|
| 5,802,515 A | 9/1998 | Adar et al. | |
| 5,812,840 A * | 9/1998 | Shwartz | 1/1 |
| 5,960,430 A * | 9/1999 | Haimowitz et al. | 1/1 |
| 6,169,986 B1 | 1/2001 | Bowman et al. | |
| 6,631,496 B1 | 10/2003 | Li et al. | |
| 7,403,942 B1 | 7/2008 | Bayliss | |
| 7,584,221 B2 | 9/2009 | Robertson et al. | |
| 7,664,742 B2 | 2/2010 | Pettovello | |
| 7,730,060 B2 * | 6/2010 | Chakrabarti et al. | 707/723 |
| 8,032,546 B2 | 10/2011 | Arasu et al. | |
| 8,352,460 B2 | 1/2013 | Allen et al. | |
| 2003/0233356 A1 * | 12/2003 | Dean et al. | 707/4 |
| 2004/0019593 A1 | 1/2004 | Borthwick et al. | |
| 2006/0041537 A1 | 2/2006 | Ahmed | |
| 2007/0294221 A1 | 12/2007 | Chen et al. | |
| 2008/0189279 A1 * | 8/2008 | Mayer et al. | 707/6 |
| 2008/0294635 A1 | 11/2008 | Dietz et al. | |
| 2009/0006349 A1 | 1/2009 | Fuxman et al. | |
| 2009/0089332 A1 | 4/2009 | Harger et al. | |
| 2009/0089630 A1 | 4/2009 | Goldenberg et al. | |
| 2009/0094416 A1 | 4/2009 | Baeza-Yates et al. | |
| 2009/0182755 A1 | 7/2009 | Adair et al. | |
| 2009/0198678 A1 | 8/2009 | Conrad et al. | |
| 2009/0198686 A1 | 8/2009 | Cushman, II et al. | |
| 2009/0259659 A1 | 10/2009 | Mericle | |
| 2009/0271694 A1 | 10/2009 | Bayliss | |
| 2010/0121839 A1 | 5/2010 | Meyer et al. | |
| 2010/0161566 A1 | 6/2010 | Adair et al. | |

(Continued)

OTHER PUBLICATIONS

Terrovitis et al., Privacy-preserving Anonymization of Set-valued Data, Proceedings of the VLDB Endowment, vol. 1, Issue 1, Aug. 2008, pp. 115-125, published by Association for Computing Machinery.

(Continued)

*Primary Examiner* — Alexey Shmatov
*Assistant Examiner* — Grace Park
(74) *Attorney, Agent, or Firm* — Patterson & Sheridan, LLP

(57) ABSTRACT

Systems, methods, and computer program products are disclosed for matching an inbound identity record to existing entities. A composite generic key may be generated from multiple entity resolution (ER) candidate-building keys determined to be generic keys. A query may be generated based on the composite generic key and executed to retrieve candidate entities for an inbound identity record.

21 Claims, 6 Drawing Sheets

(56) References Cited

U.S. PATENT DOCUMENTS

| | | | |
|---|---|---|---|
| 2010/0169360 A1 | 7/2010 | Cohen et al. | |
| 2010/0223269 A1* | 9/2010 | Shuf et al. | 707/753 |
| 2011/0099193 A1 | 4/2011 | Jensen | |
| 2011/0119280 A1* | 5/2011 | Kuo et al. | 707/754 |
| 2011/0264651 A1* | 10/2011 | Selvaraj et al. | 707/723 |
| 2012/0215808 A1 | 8/2012 | Allen et al. | |
| 2013/0066851 A1 | 3/2013 | Allen et al. | |

OTHER PUBLICATIONS

International Search Report and Written Opinion dated Dec. 16, 2011 for PCT/EP2011/065311.

Singla et al.; "Entity Resolution with Markov Logic", ICDM Sixth International Conference on, Dec. 18-22, 2006, pp. 2-11.

Bhattacharya et al.; "Query-Time Entity Resolution", Journal of Artificial Intelligence Research 30, Published Dec. 2007, pp. 621-657.

Benjelloun et al.; "D-Swoosh: A Family of Algorithms for Generic, Distributed Entity Resolution", ICDCS 27th Inter. Conf. on, Jun. 25-27, 2007, 10 pages.

Weis, Melanie, Duplicate Detection in XML Data, Dissertation, Dec. 4, 1983, pp. 1-52, University of Berlin, Berlin, Germany.

Weis, Melanie, Duplicate Detection in XML Data, Dissertation, Dec. 4, 1983, pp. 53-122, University of Berlin, Berlin, Germany.

Weis, Melanie, Duplicate Detection in XML Data, Dissertation, Dec. 4, 1983, pp. 123-182, University of Berlin, Berlin, Germany.

Weis, Melanie, Duplicate Detection in XML Data, Dissertation, Dec. 4, 1983, pp. 183-241, University of Berlin, Berlin, Germany.

\* cited by examiner

| 154 | 302 | 304 |
|---|---|---|
| ER candidate-building key | Current count | Threshold |
| John Smith | 1000 | 500 |
| 111-11-1111 | 500 | 25 |
| 123 Main St., Las Vegas, NV 89123 | 100 | 50 |
| 01/01/1970 | 3000 | 500 |

154₁ — John Smith
154₂ — 111-11-1111
154₃ — 123 Main St., Las Vegas, NV 89123
154₄ — 01/01/1970

FIG. 3

159₁ — John Smith + 111-11-1111
159₂ — John Smith + 123 Main St., Las Vegas, NV, 89123
159₃ — John Smith + 01/01/1970
159₄ — 111-11-1111 + 123 Main St., Las Vegas, NV, 89123
159₅ — 111-11-1111 + 01/01/1970
159₆ — 123 Main St., Las Vegas, NV 89123 + 01/01/1970

FIG. 4

| ER candidate-building key | Current count | Threshold |
|---|---|---|
| John Smith | 1000 | 500 |
| 111-11-1111 | 500 | 25 |
| 123 Main St., Las Vegas, NV 89123 | 100 | 50 |
| 01/01/1970 | 3000 | 500 |
| John Smith + 111-11-1111 | 200 | 262 |

{ 502 }  { 504 }  { 506 }

154₁ — John Smith
154₂ — 111-11-1111
154₃ — 123 Main St., Las Vegas, NV 89123
154₄ — 01/01/1970
159₁ — John Smith + 111-11-1111

FIG. 5

159₇ — John Smith + 111-11-1111 + 123 Main St., Las Vegas, NV, 89123
159₈ — John Smith + 111-11-1111 + 01/01/1970
159₂ — John Smith + 123 Main St., Las Vegas, NV, 89123
159₃ — John Smith + 01/01/1970
159₄ — 111-11-1111 + 123 Main St., Las Vegas, NV, 89123
159₅ — 111-11-1111 + 01/01/1970
159₆ — 123 Main St., Las Vegas, NV 89123 + 01/01/1970

FIG. 6

IDENTIFYING A SET OF CANDIDATE ENTITIES FOR AN IDENTITY RECORD

BACKGROUND

Identity resolution applications typically perform one or both of identity resolution and relationship resolution. Identity resolution attempts to answer the question "Who is who?"—i.e., determines whether multiple records that appear to describe different identities actually refer to the same entity (e.g., the same individual). For example, records identifying two women with different last names may in fact refer to the same woman having both a familial surname and a married surname. Relationship resolution attempts to answer the question "Who knows whom?" in order to determine benefits and/or risks of relationships among identities, such as customers, employees, vendors, and so forth. Relationship resolution is typically performed by cross-referencing data from various sources. For example, a relationship may be identified between two individuals sharing a common address or telephone number. An example of an identity resolution application is InfoSphere Identity Insight, available from International Business Machines Corp. (IBM®) of Armonk, N.Y.

SUMMARY

Embodiments of the invention provide a computer-implemented method, computer program product, and system for performing an operation that includes generating a plurality of entity resolution (ER) candidate-building keys from an identity record comprising a plurality of fields. The operation also includes generating, upon determining that at least two ER candidate-building keys of the plurality of ER candidate-building keys are each unsuitable for generating candidate entities for the identity record, a composite ER candidate-building key based on the at least two ER candidate-building keys. The operation also includes generating a query using the composite ER candidate-building key. The operation also includes identifying a set of candidate entities for the identity record, using the generated query.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 3 illustrates counts of candidate entities retrieved for ER candidate-building keys for the inbound identity record, according to one embodiment of the invention.

FIG. 4 illustrates an example of composite generic keys, according to one embodiment of the invention.

FIG. 5 illustrates further counts of candidate entities retrieved for ER candidate-building keys for the inbound identity record, according to one embodiment of the invention.

FIG. 6 illustrates a further example of the composite generic keys, according to one embodiment of the invention.

DETAILED DESCRIPTION

Figure 1:
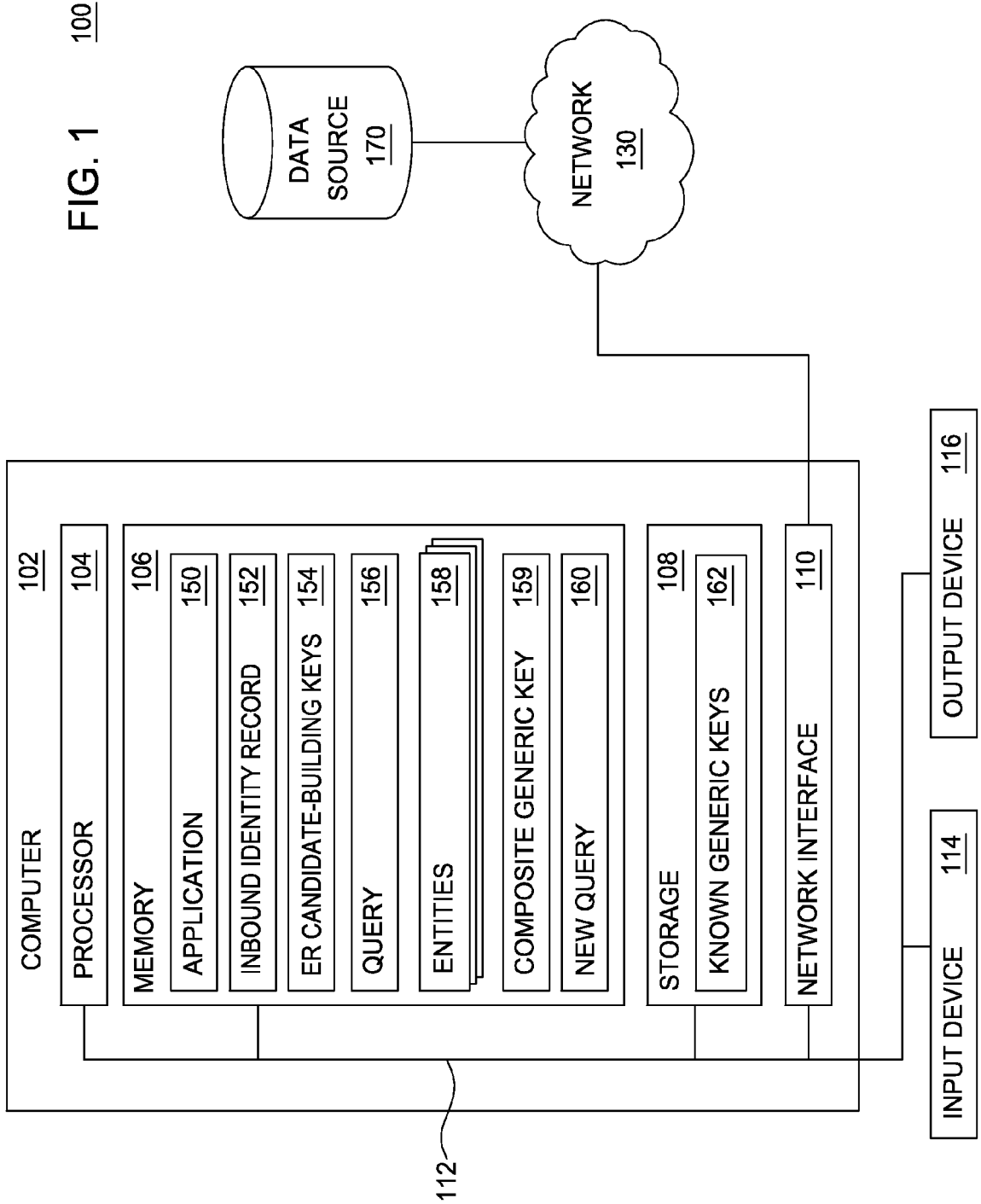
FIG. 1 is a block diagram illustrating a system for matching an inbound identity record against existing entities, according to one embodiment of the invention.

Embodiments of the invention generally provide techniques for identity resolution. One embodiment provides an application configured to resolve identity records to entity accounts, where each entity account represents a distinct individual. For example, when "Bob Smith" checks into a hotel room, a home address and telephone number from hotel check-in records may be used to match him as being the same person as an entity account for a "Robert Smith" having the same address and phone number. To match "Bob Smith" to the entity account for "Robert Smith", the identity record representing "Bob Smith" is compared to a set of individuals, each represented by a set of identity records (referred to as an entity). However, comparing the record for "Bob Smith" to each entity one-by-one may often be impractical. For example, the count of entities may be too large for one-by-one matching to be practical. Further, retrieving all entities over a computer network for matching purposes may lead to unacceptable delays in matching. To address this, in one embodiment, a set of candidate entities is generated to be matched against the identity record. That is, rather than matching the identity record against all known entities, the identity record is matched only against the set of candidate entities. Candidate entities may be selected by locating a set of shared keys between the identity record and the entity. Advantageously, by matching the identity record only against the candidate entities (rather than against all entities), the application may resolve an inbound identity record to known entities more efficiently.

In one embodiment, the application may generate a set of entity resolution (ER) candidate-building keys from the inbound identity record to identify the set of candidate entities. As used herein, an ER candidate-building key for a given identity record refers to a string that is used to build a set of candidate entities to be matched against the identity record, to resolve the identity record to known entities. As an example, the application may generate ER candidate-building keys "Bob", "Bobby", and "Robert" from the first name in the inbound identity record for "Bob Smith." However, some ER candidate-building keys may be ill-suited for identifying candidate entities. For example, the ER candidate-building key "Bobby" may generate so many matching entities that it is not worthwhile for the application to process all of the matching entities. An ER candidate-building key deemed by the application to be unsuitable for identifying candidate entities may be referred to herein as a generic ER candidate-building key (or simply, generic key).

In one embodiment, the application executes a query to retrieve entities matching any of the ER candidate-building keys. As described above, in some cases, the application may identify an ER candidate-building key as being a generic key. For example, the generic key may be defined as an ER candidate-building key that generates a count of matches that exceeds a specified threshold, such as 1000 records. The application may add the generic key to a list of known generic keys. The application may consult the list of known generic keys and refrain from including the generic keys in subsequent queries.

In one embodiment, the application generates a composite generic key from multiple generic keys. The application may then generate a query using the composite generic key. The application may then execute the query to retrieve candidate entities for the inbound identity record. Advantageously, by generating ER candidate-building keys from multiple generic keys, the application may more efficiently identify candidate entities for the inbound identity record, using multiple generic keys that may not otherwise be suitable for identifying candidate entities.

Further, one embodiment of the invention processes inbound identity records and generates alerts based on relevant identities, conditions, activities, or events. The process of resolving identity records and detecting relationships between identities may be performed using pre-determined or configurable identity resolution rules. Typically, relationships between two identities are derived from information in identity records that indicate a relationship between the two identities.

In one embodiment, the application may also include rules for detecting relevant identities, identities, conditions, or events, i.e., rules for generating alerts based on incoming identity records. For example, a rule may check the attributes of an inbound identity record and generate an alert when a particular match is found (e.g., the inbound identity record is of interest because it includes an address within a particular zip-code). Or an alert rule may specify situations where an assigned role of an inbound identity record conflicts with an assigned role of another identity record with which the inbound record has a relationship at zero or more degrees (e.g., an identity with an assigned role of "Employee" has a strong relationship to an identity with an assigned role of "Vendor"). As another example, an alert rule may be defined as a combination of both methods (e.g., alert whenever an identity with the "Nevada Gaming Black List" role also has the "Hotel Guest" role and the hotel involved is located in the state of "Nevada"). Of course, the relevance rules used may be tailored to suit the needs of a particular case.

In one embodiment, the identity resolution application generates an alert when the existence of a particular identity record (typically an inbound record being processed) causes some condition to be satisfied that is relevant in some way and that may require additional scrutiny by a user (e.g., a business analyst, an investigator of a police department, etc.). The result of these processes is typically a list of alerts about identities that should be examined by the user. Such alerts may assist the user in identifying both benefits (e.g., potential opportunities) and risks (e.g., potential threats and/or fraud).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for matching an inbound identity record against existing entities, according to one embodiment of the invention. An entity may be a set of identity records believed to refer to the same person. The networked system 100 includes a computer 102, which is connected to a data source 170 via a network 130. The computer 102 may also be connected to other computers via the network 130. The data source 170 stores identity records to be sent to the application 150 and/or entity accounts that the identity records are resolved against. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 for performing identity resolution, an inbound identity record 152, ER candidate-building keys 154, a query 156, entities 158, a composite generic key 159, and a new query 160. The storage 108 of the computer 102 includes known generic keys 162. As used herein, known generic keys refer to ER candidate-building keys previously determined to be generic (i.e., to be unsuitable for building candidates for a given identity record). In one embodiment, the application 150 receives the inbound identity record 152, which may include one or more fields. The application 150 generates the ER candidate-building keys 154 from the inbound identity record 152. The application 150 then generates the query 156 from one of the ER candidate-building keys 154 that are not known to be generic. The application 150 may determine that an ER candidate-building key 154 is not known to be generic, based on the known generic keys 162, which is further described below. The application 150 then executes the query 156 against the data source 170 to retrieve the (candidate) entities 158.

In one embodiment, if the query 156 yields a count of entities 158 exceeding a predefined threshold, then the application 150 marks the ER candidate-building key used in the query 156 as being generic. For example, the application 150 adds the ER candidate-building key to the list of known generic keys 162. If the predefined threshold is exceeded, the application 150 may also discard the candidate entities 158, because it may not be worthwhile for the application 150 to process the matching entities which have exceeded the predefined threshold (and which have caused the ER candidate-building key to be marked as generic).

In one embodiment, the list of known generic keys 162 grows over time, as queries are executed and as the data source 170 grows in size to include more data records. Accordingly, in some cases, many (or even all) of the fields of an inbound identity record 152 may include strings found in the list of known generic keys 162. In these cases, the application 150 may generate a composite generic key 159 based on two or more generic keys from the list of known generic keys 162. The application 150 may then generate a new query 160 based on the composite generic key 159. The application 150 may then execute the new query 160 to retrieve candidate entities for the inbound identity record 152. Accordingly, the application 150 may identify candidate entities more efficiently in cases where the inbound identity record 152 includes strings found in the list of known generic keys 162. These operations of the application 150 are further described below in conjunction with FIGS. 2 through 8.

Figure 2:
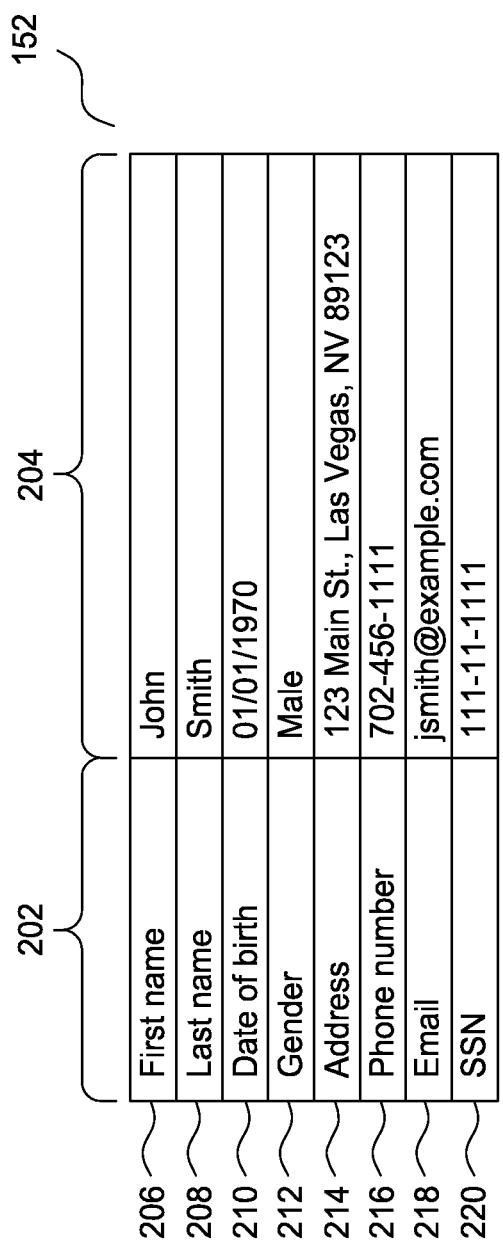
FIG. 2 illustrates an example of the inbound identity record, according to one embodiment of the invention.

FIG. 2 illustrates an example of the inbound identity record 152 of FIG. 1, according to one embodiment of the invention. As described above, the application 150 may receive and match the inbound identity record 152 to at least one of the (existing) entities 158. As shown, the inbound identity record 152 includes fields 202 and values 204. The fields 202 include a first name 206, a last name 208, a date of birth 210, a gender 212, an address 214, a phone number 216, an email address 218, and a social security number (SSN) 220. As shown, the first name 206 in the inbound identity record 152 is "John". The last name 208 in the inbound identity record 152 is "Smith". The date of birth 210 in the inbound identity record 152 is Jan. 1, 1970. The gender 212 in the inbound identity record 152 is male. The address 214 in the inbound identity record 152 is "123 Main St., Las Vegas, Nev. 89123". The phone number 216 in the inbound identity record 152 is "702-456-1111". The email address 218 in the inbound identity record 152 is "jsmith@example.com". The SSN 220 in the inbound identity record 152 is "111-11-1111". Of course, those skilled in the art will appreciate that the fields 202 and values 204 shown in FIG. 2 are merely exemplary and are not intended to limit the scope of the disclosure.

As described above, in one embodiment, the application 150 identifies candidate entities for the inbound identity record 152. To this end, the application 150 generates the ER candidate-building keys 154 from the inbound identity record 152. For example, the application 150 may generate a single ER candidate-building key 154 from each field 202 of the inbound identity record 152 of FIG. 2. In other embodiments, the application 150 may also generate an ER candidate-building key 154 from multiple fields 202 of the inbound identity record 152 (such as by concatenating first name and last name). At least in some cases, fields 202 matching a smaller number of entities may be more suitable for identity resolution than fields 202 matching a greater number of entities. This is because resolving an identity record against a candidate entity may be more computationally expensive than retrieving candidate entities based on an ER candidate-building key. Consequently, ER candidate-building keys that yield fewer candidate entities allow the application to resolve the identity record more efficiently, because the computationally expensive operations are performed on fewer candidate entities.

For example, using the gender of male in the identity record 152 as an ER candidate-building key may yield more candidate entities than using the phone number of "702-456-1111". Accordingly, for the identity record 152, the gender of male is less suitable for generating candidate entities than the phone number. Further, other fields of the identity record 152 may contain common strings, such as the first name of "John" and the last name of "Smith". Accordingly, the other fields of the identity record 152 may also be unsuitable for generating candidate entities.

In one embodiment, to determine whether a given ER candidate-building key is suitable for generating candidate entities, the application 150 checks whether the ER candidate-building key is in the list of known generic keys 162. If the ER candidate-building key is not in the list of known generic keys 162, the application 150 generates a query based on the ER candidate-building key. The application 150 then executes the query to retrieve candidate entities. If the number of candidate entities exceeds a threshold value, the application 150 marks the ER candidate-building key as generic and discards the retrieved candidate entities. The threshold value may be defined based on user input (e.g., as part of a configuration process of the application 150) and may be specific to a field and/or value of the identity record 152. Further, to mark the ER candidate-building key as generic, the application 150 may add the ER candidate-building key to the list of known generic keys 162. The application 150 then evaluates a next ER candidate-building key in a similar manner. If the next ER candidate-building key is in the list of known generic keys 162, the application 150 evaluates a subsequent ER candidate-building key. Accordingly, the application 150 maintains the list of known generic keys 162, which indicates which of the ER candidate-building keys are known to be generic.

FIG. 3 illustrates counts 302 of candidate entities retrieved for ER candidate-building keys for the inbound identity record 152 of FIG. 2, according to one embodiment of the invention. As shown, the counts 302 indicate that four ER candidate-building keys 154 each retrieve a number of candidate entities exceeding a threshold 304 specific to the respective ER candidate-building key 154. The four ER candidate-building keys 154 include a full name $154_1$, an SSN $154_2$, an address $154_3$, and a date of birth $154_4$. The full-name key $154_1$ retrieves 1000 candidate entities, which exceeds a threshold of 500 entities. The SSN key $154_2$ retrieves 500 candidate entities, which exceeds a threshold of 25 entities. The address key $154_3$ retrieves 100 candidate entities, which exceeds a threshold of 50 entities. The date-of-birth key $154_4$ retrieves 3000 candidate entities, which exceeds a threshold of 500 entities.

As described above, in some cases, such as shown in FIG. 3, many or even all of the ER candidate-building keys generated from the identity record 152 may be generic. For example, the full name key $154_1$, the SSN key $154_2$, the address key $154_3$, and the date of birth key $154_4$ are each generic. To more efficiently identify candidate entities for the identity record 152 in such cases, the application 150 may generate the composite generic key 159 based on two or more ER candidate-building keys that are known to be generic.

FIG. 4 illustrates an example of composite generic keys 159 of FIG. 1, according to one embodiment of the invention. As shown, the composite generic keys 159 include a first key $159_1$ that combines the full name and the SSN in the identity record 152, a second key $159_2$ that combines the full name and the address in the identity record 152, and a third key $159_3$ that combines the full name and the date of birth in the identity record 152. Further, the composite generic keys 159 include a fourth key $159_4$ that combines the SSN and the address in the identity record 152, a fifth key $159_5$ that combines the SSN and the date of birth in the identity record 152, and a sixth key $159_6$ that combines the address and the date of birth in the identity record 152.

As described above, in one embodiment, the application 150 may generate a composite generic key 159, such as shown in FIG. 4, to be used in a query for retrieving candidate entities for the identity record 152. Each composite generic key 159 includes multiple generic keys derived from the identity record 152. By using the composite generic key 159 in a query, the application 150 specifies that each candidate entity is to match each generic key that is included in the composite generic key 159. For example, each candidate entity retrieved for the composite generic key $159_1$ is to match both the full name "John Smith" and the SSN "111-11-1111". This intersection of candidate entities retrieved for the respective generic keys may often be a smaller set of entities than a union of candidate entities retrieved for the respective generic keys. At least in some cases, the intersection of candidate entities may also be a smaller set of entities than the candidate entities retrieved for either of the generic keys. Accordingly, by using the composite generic key 159 for generating candidate entities, the application 150 may more efficiently resolve the identity record 152 to known entities.

FIG. 5 illustrates counts 504 of candidate entities retrieved for ER candidate-building keys 502 for the inbound identity record 152 of FIG. 2, according to one embodiment of the invention. The counts 504 indicate that four ER candidate-building keys 154 each retrieve a number of candidate entities exceeding a threshold 506 specific to the respective ER candidate-building key 154. The counts 502 also indicate that a composite generic key $159_1$ retrieves a number of candidate entities not exceeding a threshold 506 associated with the composite generic key $159_1$. Specifically, the composite generic key $159_1$ retrieves 200 candidate entities, which does not exceed a threshold of 262 entities. Accordingly, by generating the composite generic key $159_1$ using the techniques disclosed herein, the application 150 may more efficiently generate a set of candidate entities suitable for resolving the identity record 152.

As described above, in one embodiment, the thresholds may be defined based on user input and may be specific to a field and/or value of the identity record 152. For example, the thresholds may be specified via a graphical user interface (GUI) provided by the application 150. In some embodiments, the GUI may also allow a user to specify a default threshold for newly generated keys. For instance, the default threshold may be selected from at least one of a maximum value, a minimum value, or an average value (e.g., mean, median, or mode)—relative to existing thresholds for all other keys. In an alternative embodiment, the default threshold is based on existing thresholds for other keys of a given field that is specified by the user. The user may also subsequently override the default threshold with a specified value. Advantageously, the application 150 may determine a threshold for a newly generated key, at least in part based on user input and without requiring the user to provide any specific value for the threshold.

In one embodiment, a composite generic key 159 may nevertheless retrieve a number of candidate entities exceeding the associated threshold. For example, assume that the composite generic key $159_1$ of FIG. 5 retrieves 300 candidate entities (rather than the 200 candidate entities as shown in FIG. 5). In this case, the application 150 may add the composite generic key $159_1$ to the list of known generic keys 162. The application 150 may then generate a new composite generic key by adding yet a third generic key to the composite generic key $159_1$ (which already includes two generic keys from the inbound identity record 152).

In one embodiment, the application 150 may store a flag that is specific to a field and/or value of the inbound identity record 152. The flag indicates whether the field and/or value should be used in generating ER candidate-building keys and/or generating composite generic keys. The application 150 may set the flag based on user input. Accordingly, the user may override a given field from being included by the application 150 during generation of ER candidate-building keys and/or composite generic keys. For example, the user may specify that the gender field 212 of FIG. 2 should not be used in generating composite generic keys, because adding the gender field 212 is not likely to yield a sufficiently small set of candidate entities.

FIG. 6 illustrates an example of the composite generic keys 159 of FIG. 1, according to one embodiment of the invention. As shown, the composite generic keys 159 include the keys $159_{2-6}$ from FIG. 4. Further, two composite generic keys $159_7$, $159_8$ are included in lieu of the first key $159_1$ from FIG. 4. Each of the two composite generic keys $159_7$, $159_8$ adds a different generic key to the first key $159_1$ from FIG. 4. Specifically, the composite generic key $159_7$ adds the address to the combination of the full name and the SSN. The composite generic key $159_8$ adds the date of birth to the combination of the full name and the SSN.

In one embodiment, the application 150 uses the composite generic keys $159_7$, $159_8$ to retrieve candidate entities for the identity record 152. If the count of retrieve candidate entities still exceeds an associated threshold, the application 150 may add yet a forth generic key, a fifth generic key, etc., to the composite generic key. Advantageously, the application 150 may generate ER candidate-building keys (namely, the composite generic keys) more efficiently and without requiring user input. In particular, the application 150 does not require the user to specify which fields and/or what thresholds should be used in generating the ER candidate-building keys.

Figure 7:
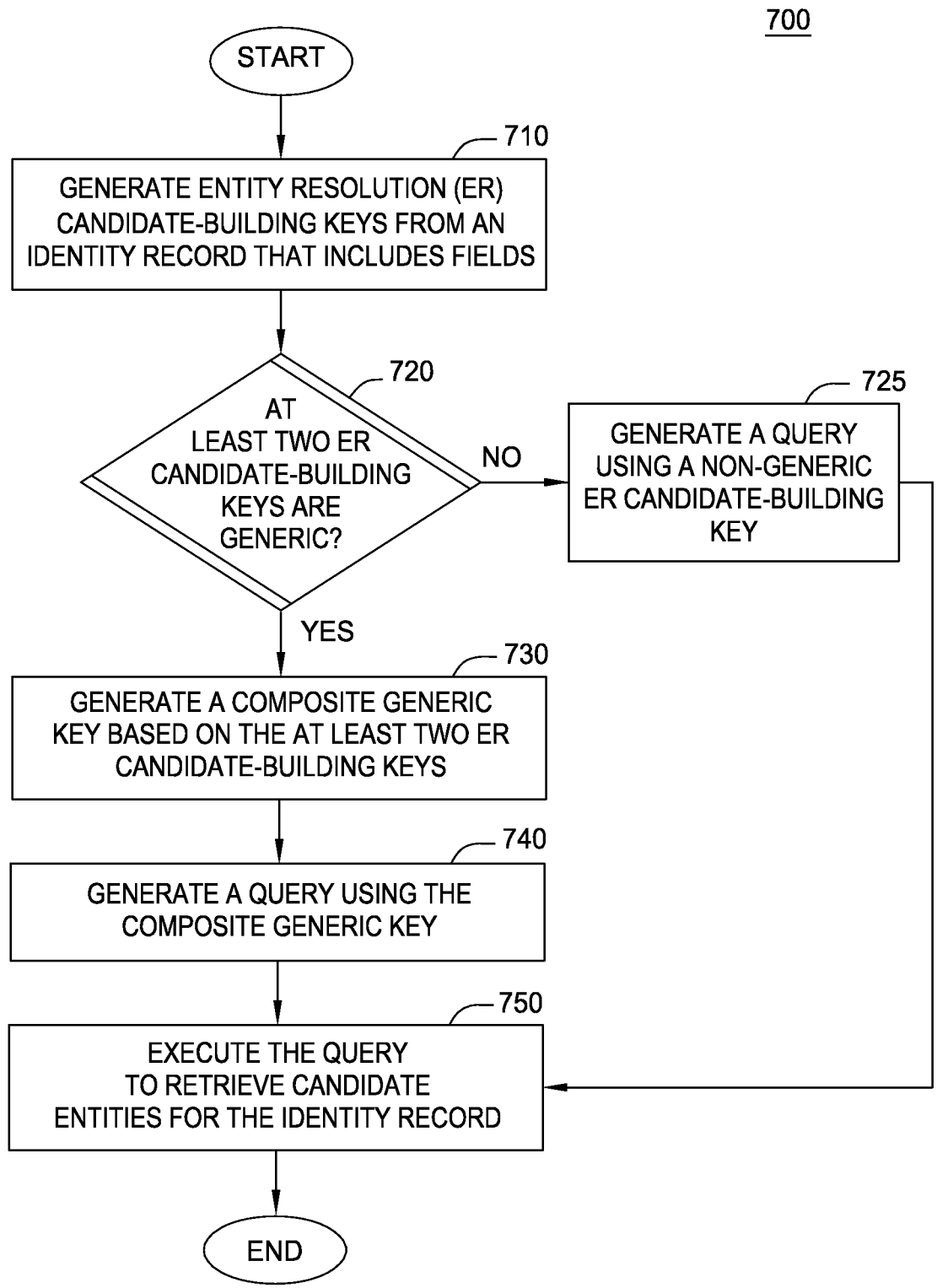
FIG. 7 is a flowchart depicting a method for generating candidate entities for the inbound identity record, according to one embodiment of the invention.

FIG. 7 is a flowchart depicting a method 700 for generating candidate entities for the inbound identity record 152 of FIG. 1, according to one embodiment of the invention. As shown, the method 700 begins at step 710, where the application 150 generates ER candidate-building keys from the inbound identity record 152, and where the inbound identity record 152 includes multiple fields. For example, the application 150 generates the ER candidate-building keys $154_{1-4}$ of FIG. 3, from the inbound identity record 152 of FIG. 2. At step 720, the application 150 determines whether at least two ER candidate-building keys are generic. The step 720 is further described below in conjunction with FIG. 8. If only one or fewer ER candidate-building keys are generic (step 720), then the application 150 generates a query using a non-generic ER candidate-building key (step 725).

On the other hand, if at least two ER candidate-building keys are generic (step 720), then the application 150 generates a composite generic key based on the at least two ER candidate-building keys (step 730). For example, the application 150 may generate the composite generic key $159_1$ of FIG. 4. The application 150 then generates a query using the composite generic key (step 740) and executes the query to retrieve candidate entities for the inbound identity record 152 (step 750). The application 150 may then add the candidate entities to a candidate set and score each entity in the candidate set. The inbound identity record may then be resolved against each of the scored entities. After the steps 750 or 725, the method 700 terminates.

Figure 8:
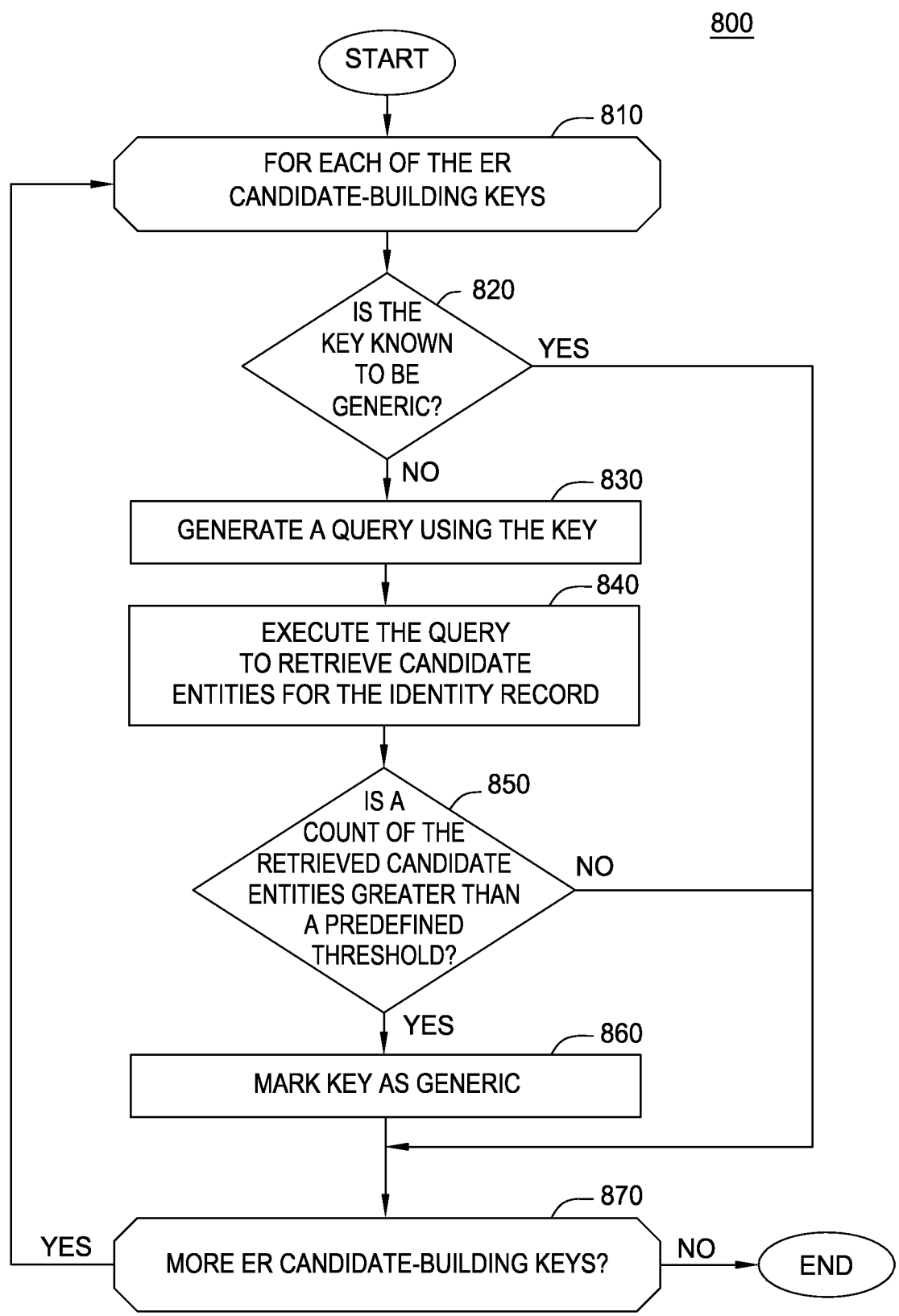
FIG. 8 is a flowchart depicting a method for determining whether at least two ER candidate-building keys for the inbound identity record are generic, according to one embodiment of the invention.

FIG. 8 is a flowchart depicting a method 800 for determining whether at least two ER candidate-building keys for the inbound identity record are generic, according to one embodiment of the invention. The method 800 corresponds to the step 720 of FIG. 7. As shown, the method 800 begins at step 810, where the application 150 enters a loop for processing the ER candidate-building keys. At step 820, the application 150 determines whether the ER candidate-building key is known to be generic, based on the list of known generic keys 162. If so, the application 150 proceeds to step 870 to process a next ER candidate-building key. Otherwise, the application 150 generates a query using the ER candidate-building key (step 830).

After the step 830, the application 150 executes the query to retrieve candidate entities for the identity record (step 840). The application 150 then determines whether a count of the retrieved candidate entities exceeds a threshold associated with the ER candidate-building key (step 850). If not, the application 150 proceeds to step 870 to process the next ER candidate-building key. Otherwise, the application 150 marks the ER candidate-building key as generic (step 850) before proceeding to step 870 to process the next ER candidate-building key. At the step 870, the application 150 determines whether any ER candidate-building keys remain to be processed. If so, the application 150 returns to the step 810 to process the next ER candidate-building key. Otherwise, the method 800 terminates.

Advantageously, embodiments of the invention provide techniques for matching an inbound identity record to existing entities. In one embodiment, an application for identity resolution may determine entity resolution (ER) candidate-building keys for an inbound identity record. The application may generate a query from the ER candidate-building keys. When processing entities retrieved from executing the query, the application may identify one or more of the ER candidate-building keys to be a generic key. Upon determining that at least two of the ER candidate-building keys are generic keys, the application may generate a composite generic key based on the at least two of the ER candidate-building keys. The application may generate a second query based on the composite generic key and execute the second query to retrieve candidate entities for the inbound identity record. Advantageously, the application may more efficiently generate a set of candidate entities suitable for resolving the identity record.

While the foregoing is directed to embodiments of the present invention, other and further embodiments of the invention may be devised without departing from the basic scope thereof, and the scope thereof is determined by the claims that follow.

What is claimed is:

1. A computer program product comprising a non-transitory computer-readable medium having computer-readable program code embodied therewith, the computer-readable program code executable by one or more computer processors to:
    generate a plurality of distinct entity resolution (ER) candidate-building keys from a single identity record comprising a plurality of fields, wherein each ER candidate-building key is generated based on a distinct field value contained in the single identity record;
    determining that at least two of the plurality of ER candidate-building keys are each unsuitable for generating a restricted set of candidate entities against which to match the single identity record, by executing a respective query generated from the respective ER candidate-building key and that yields query results exceeding a distinct threshold count specific to the respective ER candidate-building key;
    upon determining that the at least two ER candidate-building keys are each unsuitable, generate a composite ER candidate-building key based on the at least two ER candidate-building keys;
    execute a query generated based on the composite ER candidate-building key, in order to obtain the restricted set of candidate entities against which to match the single identity record, wherein the restricted set of candidate entities is selected from a plurality of available entities greater in number than the restricted set of candidate entities, wherein each entity in the restricted set of candidate entities represents a distinct individual and matches the composite ER candidate-building key;
    resolve the identity record by scoring the identity record against each candidate entity in the restricted set of candidate entities and to the exclusion of at least one available entity not in the restricted set of candidate entities;
    upon successfully resolving the single identity record to a first candidate entity in the restricted set of candidate entities, update the first candidate entity to include the single identity record;
    upon unsuccessfully resolving the single identity record to any candidate entity in the restricted set of candidate entities, generate a new entity to include the single identity record; and
    maintain a set of ER candidate-building keys determined as being unsuitable, including the at least two ER candidate-building keys, wherein the maintained set is subsequently used in order to facilitate determining an ER candidate-building key of another single identity record as being unsuitable.

2. The computer program product of claim 1, wherein the restricted set of candidate entities does not exceed a threshold count associated with the composite ER candidate-building key, wherein the computer-readable program code is further executable to:
    determine a score for each candidate entity in the restricted set of candidate entities, wherein each score is used for resolving the single identity record.

3. The computer program product of claim 1, wherein each entity in the restricted set of candidate entities matches the composite ER candidate-building key, wherein the restricted set of candidate entities includes at least one entity, wherein the restricted set of candidate entities does not in number exceed a threshold count associated with the composite ER candidate-building key, wherein the computer-readable program code is further executable to:
    determine a score for each entity in the restricted set of candidates entities, wherein the score is used for resolving the single identity record.

4. The computer program product of claim 3, wherein the respective threshold count is defined at least in part based on user input, wherein each of the plurality of ER candidate-building keys is generated based solely on a respective, single field value contained in the single identity record.

5. The computer program product of claim 4, wherein the computer program product is to programmatically salvage, without requiring user intervention, ER candidate-building keys otherwise unsuitable for generating the restricted set of candidate entities against which to match the single identity record, wherein the plurality of ER candidate-building keys is programmatically generated based on the single identity record and without requiring user intervention.

6. The computer program product of claim 5, wherein the composite ER candidate-building key is programmatically generated based on the at least two ER candidate-building keys and without requiring user intervention, wherein the single identity record is matched against the restricted set of candidate entities by an identity resolution application.

7. The computer program product of claim 6, thereby programmatically salvaging, without requiring user intervention, the at least two ER candidate-building keys otherwise unsuitable for generating the restricted set of candidate entities;
wherein the identity resolution application is configured to, in a first instance, match the single identity record against the restricted set of candidate entities in order to:
resolve the identity record to the first candidate entity of the restricted set of candidate entities, wherein the first candidate entity is updated to include the identity record.

8. The computer program product of claim 7, wherein the at least two ER candidate-building keys includes at least three ER candidate-building keys, wherein the identity resolution application is configured to, in a second instance and upon the identity record not resolving to any entity of the restricted set of candidate entities, generate the new entity that includes the identity record.

9. The computer program product of claim 8, wherein each entity in the restricted set of candidate entities matches each ER candidate-building key on which the composite ER candidate-building key is based, wherein the one or more ER candidate-building keys are derived from at least a first field value of the single identity record, wherein each ER candidate-building key is a distinct variant of a respective field value contained in the identity record.

10. The computer program product of claim 9, wherein the identity record is matched against each candidate entity in the restricted set of candidate entities and not matched against at least one available entity not in the restricted set of candidate entities, in order to avoid incurring a processing cost associated with matching against the at least one available entity.

11. The computer program product of claim 10, wherein the plurality of available entities greater in number than the restricted set of candidate entities includes at least one entity not matching the composite ER candidate-building key.

12. The computer program product of claim 11, whereby the composite ER candidate-building key is suitable for generating the restricted set of candidate entities, wherein the maintained set excludes the composite ER candidate-building key, wherein each entity represents a distinct individual assumed by the identity resolution application to exist in the physical world.

13. The computer program product of claim 1, wherein each of the plurality of ER candidate-building keys is generated based solely on a respective, single field value contained in the single identity record.

14. A system, comprising:
one or more computer processors; and
a memory containing a program which, when executed by the one or more computer processors, is configured to perform an operation comprising:
generating a plurality of distinct entity resolution (ER) candidate-building keys from a single identity record comprising a plurality of fields, wherein each ER candidate-building key is generated based on a distinct field value contained in the single identity record;
determining that at least two of the plurality of ER candidate-building keys are each unsuitable for generating a restricted set of candidate entities against which to match the single identity record, by executing a respective query generated from the respective ER candidate-building key and that yields query results exceeding a distinct threshold count specific to the respective ER candidate-building key;
upon determining that the at least two ER candidate-building keys are each unsuitable, generating a composite ER candidate-building key based on the at least two ER candidate-building keys;
executing a query generated based on the composite ER candidate-building key, in order to obtain the restricted set of candidate entities against which to match the single identity record, wherein the restricted set of candidate entities is selected from a plurality of available entities greater in number than the restricted set of candidate entities, wherein each entity in the restricted set of candidate entities represents a distinct individual and matches the composite ER candidate-building key;
resolving the identity record by scoring the identity record against each candidate entity in the restricted set of candidate entities and to the exclusion of at least one available entity not in the restricted set of candidate entities;
upon successfully resolving the single identity record to a first candidate entity in the restricted set of candidate entities, updating the first candidate entity to include the single identity record;
upon unsuccessfully resolving the single identity record to any candidate entity in the restricted set of candidate entities, generating a new entity to include the single identity record; and
maintaining a set of ER candidate-building keys determined as being unsuitable, including the at least two ER candidate-building keys, wherein the maintained set is subsequently used in order to facilitate determining an ER candidate-building key of another single identity record as being unsuitable.

15. The system of claim 14, wherein the restricted set of candidate entities does not exceed a threshold count associated with the composite ER candidate-building key, wherein the operation further comprises:
determining a score for each candidate entity in the restricted set of candidates entities, wherein each score is used for resolving the single identity record.

16. The system of claim 14, wherein each of the plurality of ER candidate-building keys is generated based solely on a respective, single field value contained in the single identity record.

17. The system of claim 14, wherein the respective threshold count is defined at least in part based on user input.

18. A computer-implemented method, comprising:
generating a plurality of distinct entity resolution (ER) candidate-building keys from a single identity record, wherein each ER candidate-building key is generated based on a distinct field value contained in the single identity record;
determining that at least two of the plurality of distinct ER candidate-building keys are each unsuitable for generating a restricted set of candidate entities against which to match the single identity record, by executing a respective query generated from the respective ER candidate-building key and that yields query results exceeding a distinct threshold count specific to the respective ER candidate-building key;
upon determining that the at least two ER candidate-building keys are each unsuitable, generating a composite ER candidate-building key based on the at least two ER candidate-building keys and by operation of one or more computer processors;
executing a query generated based on the composite ER candidate-building key, in order to obtain the restricted set of candidate entities against which to match the single identity record, wherein the restricted set of candidate entities is selected from a plurality of available entities greater in number than the restricted set of candidate entities, wherein each entity in the restricted set of candidate entities represents a distinct individual and matches the composite ER candidate-building key;

resolving the identity record by scoring the identity record against each candidate entity in the restricted set of candidate entities and to the exclusion of at least one available entity not in the restricted set of candidate entities;

upon successfully resolving the single identity record to a first candidate entity in the restricted set of candidate entities, updating the first candidate entity to include the single identity record;

upon unsuccessfully resolving the single identity record to any candidate entity in the restricted set of candidate entities, generating a new entity to include the single identity record; and maintaining a set of ER candidate-building keys determined as being unsuitable, including the at least two ER candidate-building keys, wherein the maintained set is subsequently used in order to facilitate determining an ER candidate-building key of another single identity record as being unsuitable.

19. The computer-implemented method of claim 18, wherein the restricted set of candidate entities does not exceed a threshold count associated with the composite ER candidate-building key, wherein the computer-implemented method further comprises:

determining a score for each candidate entity in the restricted set of candidate entities, wherein each score is used for resolving the single identity record.

20. The computer-implemented method of claim 18, wherein each of the plurality of ER candidate-building keys is generated based solely on a respective, single field value contained in the single identity record.

21. The computer-implemented method of claim 18, wherein the respective threshold count is defined at least in part based on user input.

* * * * *